United States Patent
Weber

(10) Patent No.: US 9,561,857 B2
(45) Date of Patent: Feb. 7, 2017

(54) AIRCRAFT THERMAL MANAGEMENT SYSTEM FOR COOLING USING EXPENDABLE COOLANTS

(71) Applicant: Raytheon Company, Waltham, MA (US)

(72) Inventor: Richard M. Weber, Prosper, TX (US)

(73) Assignee: Raytheon Company, Waltham, MA (US)

( * ) Notice: Subject to any disclaimer, the term of this patent is extended or adjusted under 35 U.S.C. 154(b) by 1105 days.

(21) Appl. No.: 13/761,081

(22) Filed: Feb. 6, 2013

(65) Prior Publication Data

US 2014/0216088 A1    Aug. 7, 2014

(51) Int. Cl.
  *B64D 13/08*   (2006.01)
  *B64D 33/08*   (2006.01)
  *B64D 37/34*   (2006.01)

(52) U.S. Cl.
  CPC ........... *B64D 13/08* (2013.01); *B64D 33/08* (2013.01); *B64D 37/34* (2013.01)

(58) Field of Classification Search
  CPC .. B64D 2013/0614; B64D 37/34; B64D 33/08; B64D 2013/0674; F25C 2301/002; F25B 25/005; F24F 2005/0025; F24F 5/0021; F24F 5/0017
  USPC .................................................. 62/434, 432
  See application file for complete search history.

(56) References Cited

U.S. PATENT DOCUMENTS

| | | |
|---|---|---|
| 2,575,541 A | 11/1951 | Williamson, Jr. et al. |
| 4,273,304 A | 6/1981 | Frosch et al. |
| 4,405,100 A | 9/1983 | Daniels |
| 4,505,124 A * | 3/1985 | Mayer .................... B64D 37/34 123/553 |
| 4,671,348 A | 6/1987 | Bauer |
| 4,776,536 A | 10/1988 | Hudson et al. |
| 5,398,519 A | 3/1995 | Weber et al. |
| 5,507,150 A | 4/1996 | Weber et al. |

(Continued)

FOREIGN PATENT DOCUMENTS

EP       2 273 088 A1    1/2011

OTHER PUBLICATIONS

Notification of Transmittal of the International Search Report and the Written Opinion of the International Searching Authority, or the Declaration dated Oct. 30, 2014 in connection with International Patent Application No. PCT/US2014/020860.

(Continued)

*Primary Examiner* — Cassey D Bauer

(57) ABSTRACT

A system for cooling an aircraft includes a fuel tank, a fuel delivery system, a cooling system, and a heat exchanger. The fuel tank is configured to hold cooled fuel for the aircraft. The fuel delivery system is configured to provide at least a portion of the fuel from the fuel tank to an engine of the aircraft. The cooling system is configured to absorb heat generated by components on the aircraft. The heat exchanger is thermally connected to the fuel delivery system and the cooling system. The heat exchanger is configured to transfer at least a portion of the heat from the components on the aircraft to the cooled fuel. The system may further include a two or three phase expendable liquid system. The expendable liquid system is configured to transfer heat to a frozen or liquid coolant to vaporize and expend the coolant from the aircraft.

21 Claims, 4 Drawing Sheets

(56) References Cited

U.S. PATENT DOCUMENTS

| | | |
|---|---|---|
| 6,182,435 B1 | 2/2001 | Niggemann et al. |
| 6,415,595 B1 | 7/2002 | Wilmot, Jr. et al. |
| 6,939,392 B2 | 9/2005 | Huang et al. |
| 7,260,926 B2 | 8/2007 | Sabatino et al. |
| 8,042,343 B2 | 10/2011 | Jarlestal |
| 2012/0000205 A1 | 1/2012 | Coffinberry et al. |
| 2014/0216088 A1 | 8/2014 | Weber |

OTHER PUBLICATIONS

Communication Relating to the Results of the Partial International Search dated Aug. 25, 2014 in connection with International Patent Application No. PCT/US2014/020860.

de Bock et al., "Thermal Challenges in Today's Commercial and Military Aviation", Electronics Cooling Magazine, Mar. 1, 2011, 6 pages.

\* cited by examiner

AIRCRAFT THERMAL MANAGEMENT SYSTEM FOR COOLING USING EXPENDABLE COOLANTS

TECHNICAL FIELD

This disclosure is generally directed to aircraft cooling systems. More specifically, this disclosure relates to the use of expendable coolants in providing cooling to aircraft components.

BACKGROUND

Aircraft components such as on-board electronics and line replaceable units (LRUs) generate heat during flight. High-speed aircraft also generate heat on the outer surface of the aircraft as a result of friction caused with the atmosphere. All of this heat affects the length of time that the aircraft can be used. Some aircraft use "ram-air" or "bleed-air" techniques to cool aircraft components.

However, the use of such cooling techniques may not provide sufficient cooling in certain scenarios. Given concerns of conventional systems, this disclosure provides an aircraft thermal management system for cooling using expendable coolants.

SUMMARY

An aircraft thermal management system for cooling using expendable coolants.

In various embodiments, an apparatus and system for cooling an aircraft include a fuel tank, a fuel delivery system, a cooling system, and a heat exchanger. The fuel tank is configured to hold cooled fuel, the fuel cooled prior to a takeoff of the aircraft. The fuel delivery system is configured to provide at least a portion of the fuel from the fuel tank to an engine of the aircraft. The cooling system is configured to absorb heat generated by components on the aircraft. The heat exchanger is thermally connected to the fuel delivery system and the cooling system. The heat exchanger is configured to transfer at least a portion of the heat from the components on the aircraft to the cooled fuel.

In various embodiments, an apparatus and system for cooling an aircraft includes a reservoir, a cooling system, a first heat exchanger, a fluid transfer device, a second heat exchanger, and a vent. The reservoir is configured to hold a coolant at least a portion of which is frozen. The cooling system is configured to absorb heat generated by components on the aircraft. The first heat exchanger is thermally connected to the reservoir and the cooling system. The first heat exchanger configured to transfer at least a portion of the heat from the components on the aircraft to the frozen portion of the coolant to melt at least a portion of the coolant. The fluid transfer device is configured to transfer the melted portion of the coolant to a second heat exchanger. The second heat is exchanger thermally connected to the cooling system. The second heat exchanger is configured to transfer at least a portion of the heat from the components on the aircraft to the melted portion of the coolant to vaporize at least a portion of the coolant. The vent is configured to expend the vaporized portion of the coolant from the aircraft.

In various embodiments, a method for cooling an aircraft includes cooling fuel for the aircraft. The method includes holding the fuel in a fuel tank on the aircraft. The method includes transferring at least a portion of a flow of the cooled fuel from the fuel tank to an engine of the aircraft. The method includes absorbing heat generated by components on the aircraft. Additionally, the method includes transferring at least a portion of the heat absorbed from the components on the aircraft into the flow of the cooled fuel.

In various embodiments, a method for cooling an aircraft includes holding a coolant in a reservoir. At least a portion of the coolant is frozen. The method includes absorbing heat generated by components on the aircraft. The method includes transferring at least a portion of the heat absorbed from the components on the aircraft to the frozen portion of the coolant to melt at least a portion of the coolant. The method includes transferring at least a portion of the heat absorbed from the components on the aircraft to the melted portion of the coolant to vaporize at least a portion of the coolant. Additionally, the method includes expending the vaporized portion of the coolant from the aircraft.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
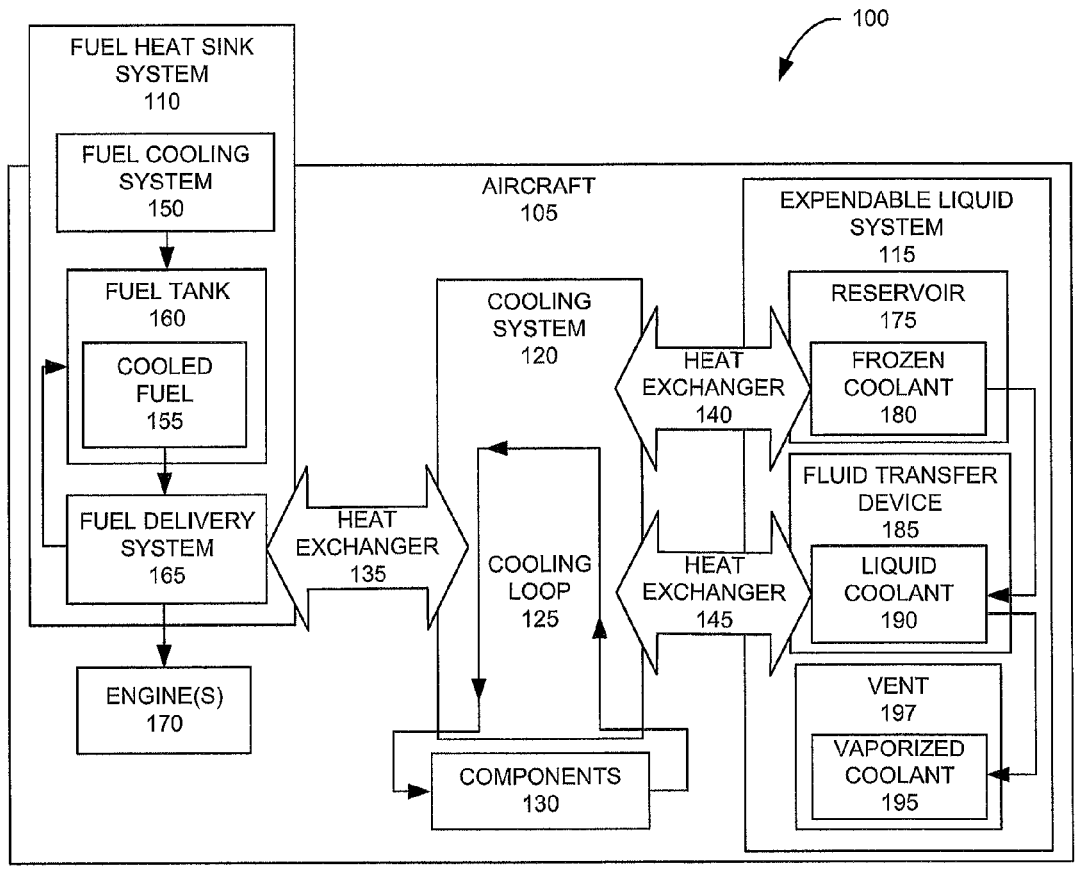
FIG. 1 illustrates a block diagram of a thermal management system for cooling an aircraft in accordance with various embodiments of the present disclosure.

FIG. 1 illustrates a block diagram of a thermal management system 100 for cooling an aircraft 105 in accordance with various embodiments of the present disclosure. As illustrated, the thermal management system 100 includes a fuel heat sink system 110 and an expendable liquid system 115. In various embodiments, the thermal management system 100 uses fuel in the fuel heat sink system 110 and liquids in the expendable liquid system 115 as expendable coolants to cool the aircraft 105.

The aircraft 105 includes a cooling system 120. The cooling system 120 includes pipes and/or tubes that form a cooling loop 125 within the aircraft 105. In various embodiments, the cooling loop 125 contains a liquid coolant that flows through the pipes and/or tubes in the aircraft 105 to absorb heat produced by various components 130 located throughout the aircraft 105. For example, the cooling system 120 may be a closed loop cooling system that circulates an ethylene glycol and water mixture or polyalphaolifin (PAO) in the cooling loop 125 to absorb heat produced by on-board electronics.

According to embodiments of the present disclosure, the cooling system 120 transfers the heat absorbed from the components 130 to the fuel heat sink system 110 and the expendable liquid system 115 via heat exchangers 135, 140, and 145, respectively. The fuel heat sink system 110 and the expendable liquid system 115 use expendable coolants to absorb and expend the heat produced by the aircraft 105 to cool the aircraft 105.

The fuel heat sink system 110 includes a fuel cooling system 150 to cool the fuel 155 used by the aircraft 105. In some embodiments, the fuel cooling system 150 may cool the fuel 155 prior to the fuel 155 being placed in the fuel tank 160 of the aircraft 105. Thus, portions of the fuel heat sink system 110 and the fuel cooling system 150 may be located externally to the aircraft 105. For example, the location the aircraft 105 is fueled at may include fuel chillers that dispense fuel that is cooled to temperatures lower than the ambient temperature.

Figure 5:
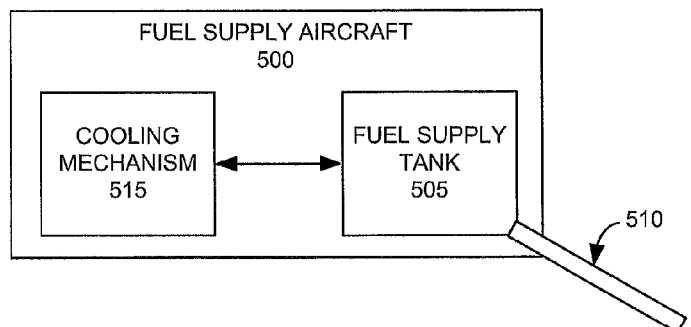
FIG. 5 illustrates a block diagram of a fuel supply aircraft capable of supplying chilled fuel to an aircraft during flight in accordance with various embodiments of the present disclosure.

In another example, the aircraft 105 may be supplied with cooled fuel during a mid-flight refueling. FIG. 5 illustrates a block diagram of a fuel supply aircraft 500 capable of supplying chilled fuel to the aircraft 105 during flight in accordance with various embodiments of the present disclosure. The fuel supply aircraft 500 may be an aircraft tanker, such as a KC-135 that is capable of supplying the aircraft 105 with fuel during flight. In this illustrative example, the fuel supply aircraft 500 includes a fuel supply tank 505 and a fuel supply boom 510. During a mid-air refueling session, the fuel supply boom 510 extends from the fuel supply aircraft 500 and connects to an opening into the fuel tank 160 of the aircraft 105 to supply the fuel to the aircraft 105 during flight.

In various embodiments, the fuel supply aircraft 500 includes a cooling mechanism 515 that cools or otherwise maintains a cooled temperature of the fuel so as to supply the aircraft 105 with the cooled fuel in order to implement the aircraft cooling techniques in various embodiments of the present disclosure. This cooling mechanism 515 may use bleed air, a ram air heat exchanger, a cooling loop, and/or cooling coils to cool or otherwise maintain a cooled temperature of the fuel prior to the fuel being dispensed to the aircraft 105. Because of the lower the flight elevation and slower flying speeds, the fuel supply aircraft 500 is better situated than the aircraft 105 to use such cooling techniques. For example, the fuel supply aircraft 500 may be a standard aerial refueling aircraft tanker that is modified in accordance with the principals of the present disclosure to cool or otherwise maintain a cooled temperature of the fuel.

In other embodiments, the fuel 155 may be cooled while in the fuel tank 160. For example, the fuel tank 160 may include cooling coils and/or may use ground support equipment to chill or maintain a chilled temperature of the fuel 155 prior to the aircraft 105 taking off.

In various embodiments, the fuel heat sink system 110 and the fuel cooling system 150 may include components that are located on the aircraft 105 and located externally to the aircraft 105. For example, the fuel cooling system 150 dispenses the cooled fuel 155 to the aircraft 105 and prior to takeoff the aircraft 105 may continue to keep the fuel 155 chilled using cooling coils on the aircraft 105. In these embodiments, the fuel tank 160 may be insulated to maintain the temperature of the fuel 155.

The fuel heat sink system 110 includes a fuel delivery system 165 to deliver the cooled fuel 155 to the engine(s) 170 of the aircraft 105. The fuel delivery system 165 is thermally connected to the cooling system 120 via heat exchanger 135. Thermally connected, as used herein, means connected in such a manner that thermal energy is capable of being transferred from one of the thermally connected components to another of the thermally connected components. For example, the heat exchanger 135 may include coils containing fluid from the cooling system 120 and/or the fuel delivery system 165 that are immersed in fluids from the other of the cooling system 120 or the fuel delivery system 165. In various embodiments, the fuel delivery system 165 may provide a relatively constant flow of chilled fuel from the fuel tank 160. The fuel delivery system 165 may include a controllable valve to provide an appropriate amount of the fuel 155 from the fuel tank 160 to the engine(s) 170 while returning the unused fuel from the relatively constant flow to the fuel tank 160. The fuel flow provided by the fuel delivery system 165 may be constant to the heat exchanger 135 regardless of engine consumption. This may ensure stable cooling system operation.

In these embodiments, the heat exchanger 135 transfers, exchanges, and/or dumps heat absorbed from the components 130 into the chilled fuel supplied by the fuel delivery system 165. The fuel 155 is ultimately expended from the aircraft 105 by the engine(s) 170. As a result, the fuel heat sink system 110 is able to provide significant cooling to the aircraft 105 using the cooled fuel 155. The cooling ability of the fuel heat sink system 110 may be significant because the fuel on the aircraft 105 may constitute a significant portion of the total mass of the aircraft 105. Since the aircraft 105 is able to use such a large portion of the initial mass of aircraft 105 as a heat sink, the aircraft 105 is able to experience improved cooling ability and, as a result, the mission time for the aircraft may be extended as well.

In various embodiments of the present disclosure, the aircraft 105 includes the expendable liquid system 115. The expendable liquid system 115 uses a three-phase expendable coolant to improve the cooling ability of the cooling system 120 and the aircraft 105. For example, the coolant used in the expendable liquid system 115 may be water, alcohol, a mixture of water and alcohol, or some other type of coolant.

At least a portion of coolant in the expendable liquid system 115 is initially maintained in a reservoir 175 as a frozen coolant 175. The reservoir 175 is thermally connected to the cooling system 120 via heat exchanger 140. For example, the heat exchanger 140 may include coils in the reservoir 175. Coolant in the cooling loop 125 may transfer heat absorbed from the components 130 to the frozen coolant in the reservoir 175 via the heat exchanger 140. The transferred heat is absorbed by the frozen coolant 180 causing the frozen coolant 180 to melt.

The expendable liquid system 115 also includes a fluid transfer device that holds a liquid coolant 190. The liquid coolant 190 may be a melted portion of the frozen coolant 180, coolant initially placed on the aircraft in a liquid form, or a combination of the two. The fluid transfer device 185 is thermally connected to the cooling system 120 via heat exchanger 145. For example, the heat exchanger 145 may include coils in the fluid transfer device 185. Coolant in the cooling loop 125 may transfer heat absorbed from the components 130 to the liquid coolant in the fluid transfer device 185 via the heat exchanger 145. The transferred heat is absorbed by the liquid coolant 190. Once a portion of the liquid coolant 190 has received the latent heat of vaporization the liquid coolant 190 vaporizes into vaporized coolant 195, which is expended from the aircraft 105 via vent 197.

In these embodiments, the heat exchangers 140 and 145 transfers, exchanges, and/or dumps heat absorbed from the components 130 into the coolant in the expendable liquid system 115. The coolant in the expendable liquid system 115 goes through two-phase changes and is ultimately expended from the aircraft 105. As a result, the expendable liquid system 115 is able to provide significant cooling to the aircraft 105 using the expendable three-phase coolant. Since the aircraft 105 is able to expend heat from the using this three-phase expendable coolant, the aircraft 105 is able to experience improved cooling ability and, as a result, the mission time for the aircraft may be extended as well.

The illustration of thermal management system 100 is intended as an example of the embodiments that may be implemented in accordance with the present disclosure and is not intended to imply any physical or architectural limitations to the various embodiments that may be implemented in accordance with the principals of the present disclosure. For example, in some embodiments the thermal management system 100 may include only one and not both of the fuel heat sink system 110 and the expendable liquid system 115. In some embodiments, portions of the fuel heat sink system 110 and/or the expendable liquid system 115 may be located externally to the aircraft 105. In other embodiments, the fuel heat sink system 110 and/or the expendable liquid system 115 may be located entirely within the aircraft 105. In some embodiments, the aircraft 105 may include multiple fuel tanks 160 containing chilled fuel.

Figure 2:
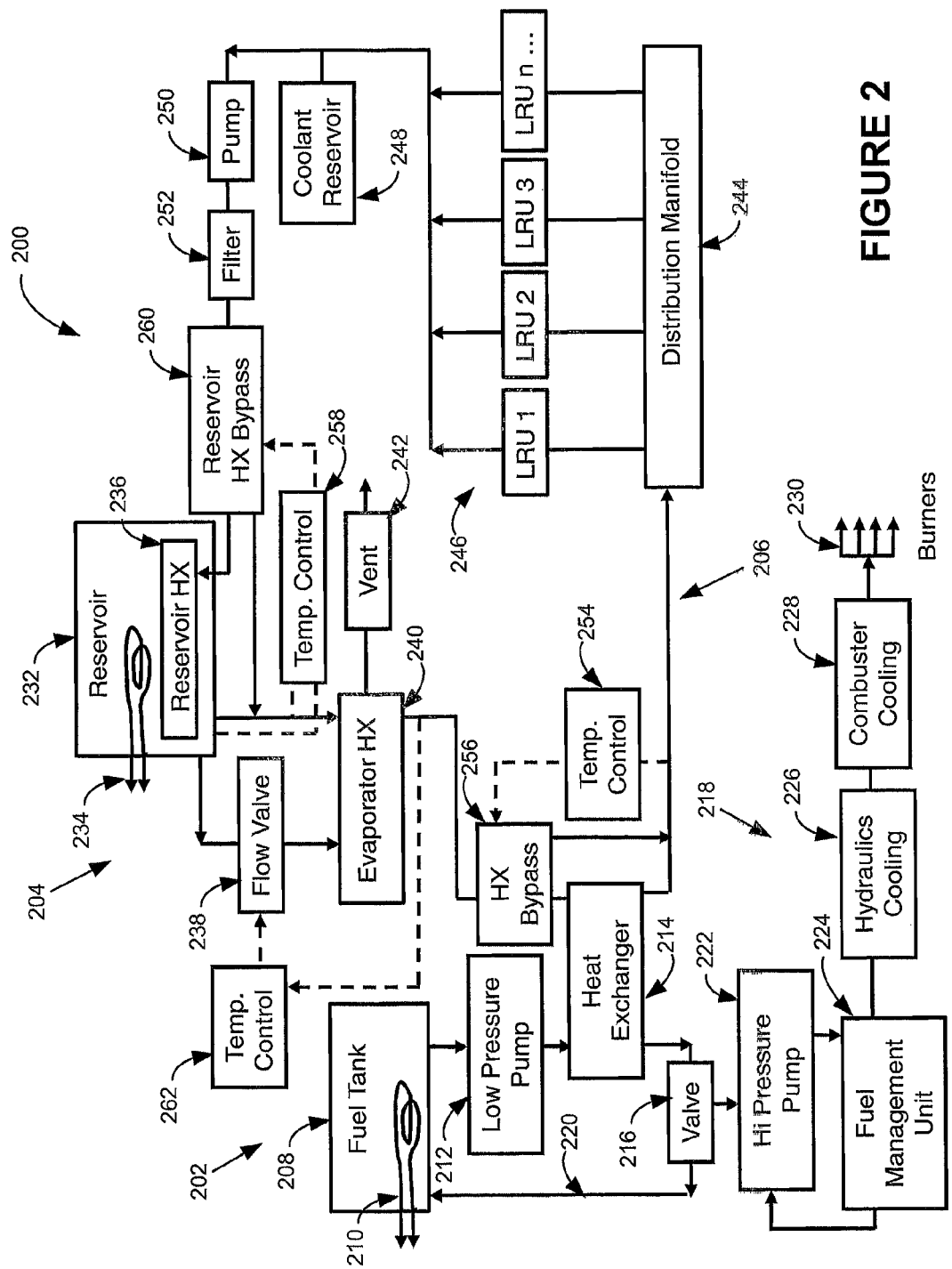
FIG. 2 illustrates a thermal management system in accordance with various embodiments of the present disclosure.

FIG. 2 illustrates a thermal management system 200 in accordance with various embodiments of the present disclosure. In this illustrative embodiment, the thermal management system 200 is an example of one embodiment of the thermal management system 100 in FIG. 1. For example, the thermal management system 200 includes a fuel heat sink system 202, an expendable liquid system 204, and a closed loop cooling system 206.

The fuel heat sink system 202 uses cooled fuel to absorb heat from components on the aircraft. The fuel heat sink system 202 includes a fuel tank 208 including cooling coils 210, a low-pressure pump 212, a heat exchanger (FIX) 214, and a valve 216. The fuel tank 208 and cooling coils 210 receives and/or cools fuel. The low-pressure pump 212 provides a constant flow of fuel through the heat exchanger 214. The heat exchanger 214 absorbs heat transferred by the closed loop cooling system 206. The valve 216 provides an appropriate amount of fuel to an engine fuel system 218 and returns the remaining portion to the fuel tank 208 to form a loop 220 in the fuel heat sink system 202. The engine fuel system 218 includes a high-pressure pump 222, a fuel management unit 224, hydraulics cooling 226, combustor cooling 228 and burners 230. The engine fuel system 218 receives and uses the fuel provided from the fuel heat sink system 202 to power the aircraft.

In one example embodiment, the aircraft 105 is a hypersonic aircraft that may cruse at speeds of about Mach 5 and altitudes of about 100,000 ft. with expected mission times of around three to four hours. Under these types of conditions, the aircraft may experience a heat load of anywhere from 50 kW to 250 kW or greater. Under these conditions, the use of ram-air cooling may not be sufficient to handle this type of heat load. Accordingly, in various embodiments, the fuel heat sink system 202 does not need/use "bleed air" from engine (which is potentially not viable in a scramjet), does not use an air cycle system to create cold air from bleed air, does not use a vapor cycle system, and does not use a ram air HX to dump heat. These cooling techniques may not be viable with an aircraft traveling at hypersonic speeds. Rather, various embodiments in accordance with the present disclosure use chilled fuel to cool the aircraft.

The expendable liquid system 204 removes waste heat transferred by the closed loop cooling system 206 from electronic or other heat producing systems on the aircraft. The expendable liquid system 204 includes a reservoir 232, cooling coils 334, a reservoir heat exchanger 236, a flow valve 238, an evaporator heat exchanger 240, and a vent 242. The expendable liquid system 204 uses a coolant (e.g., water, water and alcohol mixture, etc.) that can initially be frozen in the form of a solid (e.g., ice). The frozen coolant is melted by absorbing waste heat from the closed loop cooling system 206 via the reservoir heat exchanger 236 and changes from the solid state to a liquid state. The expendable liquid system 204 then feeds the liquid coolant to the evaporative heat exchanger 240 via flow valve 238 where further waste heat is absorbed as the liquid coolant changes from the liquid state to a vapor sate where the absorbed waste heat is dumped overboard by the vapor steam via the vent 242. In this illustrative embodiment, heat is absorbed in the expendable liquid system 204 by two phase changes of the expendable coolant. The expendable liquid system 204 may provide a large portion the cooling capacity for the aircraft, particularly in situations where the fuel load may be relatively small thus not providing significant heat sinking. The expendable liquid system 204 may absorb heat using both the latent heat of fusion and the latent heat of vaporization.

The coolant in the reservoir 232 may be chilled prior to flight to create ice. For example, the cooling coils 234 may freeze all or a portion of the coolant in the reservoir 232. In some embodiments, an external coolant may be used to freeze the coolant as part of preflight preparation. Ice may also form in the reservoir 232 due to cold temperatures while the aircraft is on the ground. For example, in some embodiments, the cooling coils 234 may not be present to intentionally freeze the coolant but the reservoir heat exchanger 236 may be present to melt ice that is formed in the reservoir 232. The liquid coolant in the evaporator heat exchanger 240 may boil in the 5 to 20° C. range. The boiling point may be modified using an absolute pressure back pressure regulator.

The closed loop cooling system 206 transfers heat from heat producing components to heat sinking elements within the aircraft. For example, the closed loop cooling system 206 includes a coolant that flows via distribution manifold 244 through heat producing components 246 (e.g., LRU 1 to LRU n). The closed loop cooling system 206 includes a coolant reservoir 248, a pump 250 and a filter 252 to supply a flow of coolant though the cooling loop of the closed loop cooling system 206.

The heat absorbed in the cooling loop is transferred to heat sinking elements within the aircraft. For example, the heat exchanger 214 transfers heat to the fuel heat sink system 202. The temperature control 254 monitors the temperature of the fuel and the coolant at the heat exchanger 214 and may cause all or a portion of the coolant to bypass the heat exchanger 214 via heat exchanger bypass 256. For example, if the fuel is no longer able to absorb the heat from the cooling loop, the temperature control 254 may cause the coolant to bypass the heat exchanger 214.

In another example, the heat exchangers 236 and 240 transfers heat to the expendable liquid system 204. The temperature control 258 monitors the temperature of the coolant in the reservoir 232 and the coolant in the cooling loop at the reservoir heat exchanger 236 and may cause all or a portion of the coolant to bypass the reservoir heat exchanger 236 via heat exchanger bypass 260. For example, if ice is no longer present in the reservoir 232, the temperature control 258 may cause the coolant to bypass the reservoir heat exchanger 236 via heat exchanger bypass 260. The temperature control 262 monitors the temperature of the coolant in the flow valve 238 and the coolant in the cooling loop at the evaporator heat exchanger 240 to control the flow of the coolant in the cooling loop through the evaporator heat exchanger 240. The temperature controllers 258, 262, and 254 control the temperature of the coolant in loop 206 to a desired temperature range to prevent the coolant from getting too cold. For example, this desired temperature range may be about 10-40° C.

Figure 3:
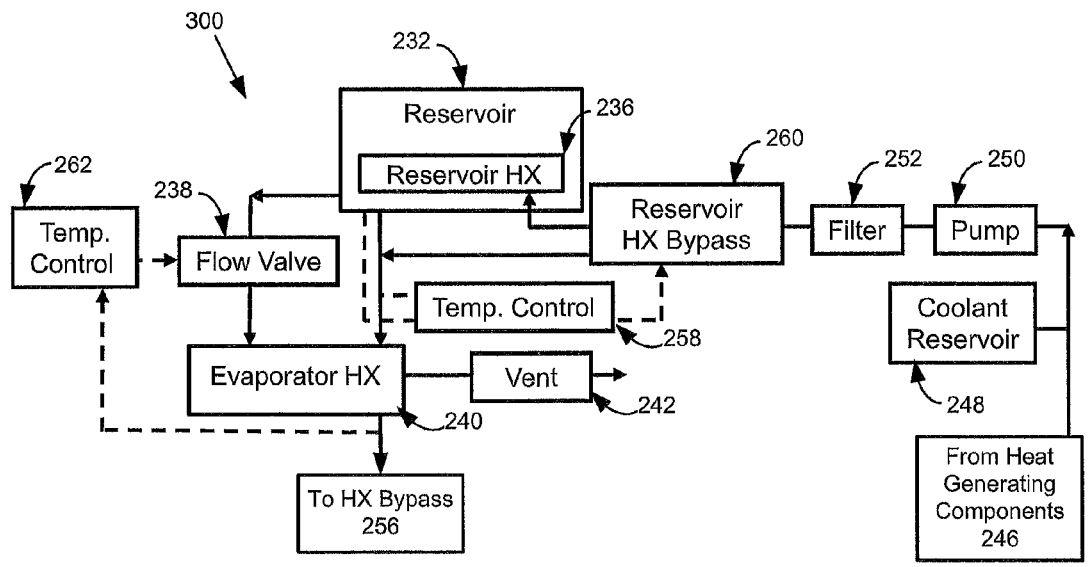
FIG. 3 illustrates an embodiment of an expendable liquid system for the thermal management system illustrated in FIG. 2 in accordance with various embodiments of the present disclosure.

FIG. 3 illustrates an embodiment of an expendable liquid system 300 for the thermal management system 200 of FIG. 2 in accordance with various embodiments of the present disclosure. In this illustrative embodiment, the expendable liquid system 300 may be used in place of the expendable liquid system 204 in FIG. 2. The expendable liquid system 300 includes the reservoir heat exchanger 236 to melt ice that may have formed due to ground conditions. However, the expendable liquid system 300 does not include the cooling coils 234 as in the expendable liquid system 204 in FIG. 2. In this illustrative embodiment, the intent is not to intentionally freeze the coolant in the reservoir but still be able to melt ice that may have formed.

Figure 4:
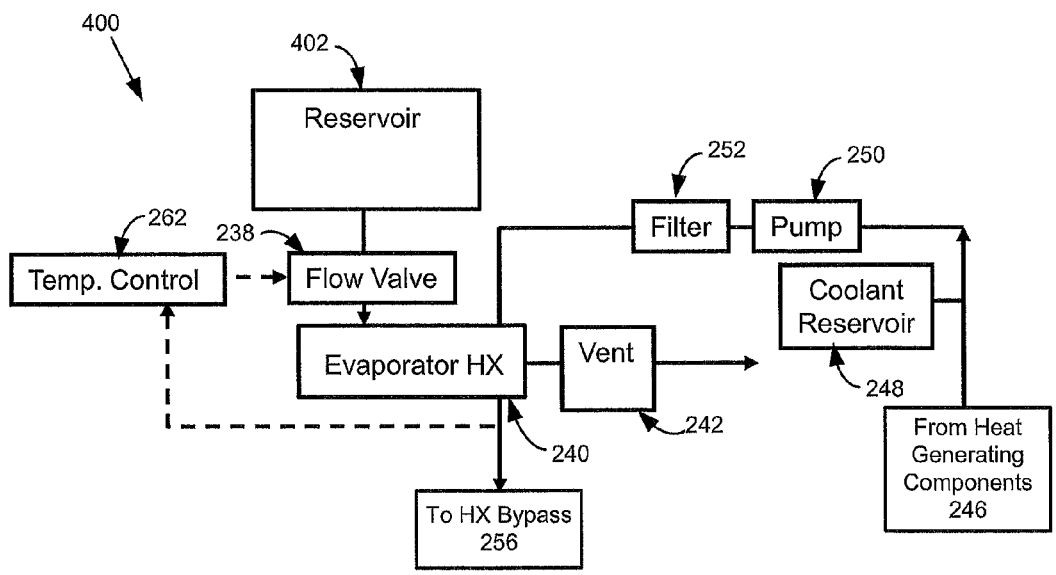
FIG. 4 illustrates another embodiment of an expendable liquid system for the thermal management system illustrated in FIG. 2 in accordance with various embodiments of the present disclosure.

FIG. 4 illustrates another embodiment of an expendable liquid system 400 for the thermal management system 200 of FIG. 2 in accordance with various embodiments of the present disclosure. In this illustrative embodiment, the expendable liquid system 400 may be used in place of the expendable liquid system 204 in FIG. 2. In this illustrative embodiment, the expendable liquid system 400 includes a reservoir 402 that holds a liquid coolant. The expendable liquid system 400 does not include the reservoir heat exchanger 236 to melt frozen coolant as in the expendable liquid system 300 in FIG. 3 or the expendable liquid system 204 in FIG. 2. Similarly, the expendable liquid system 400 does not include the temperature control 258 of the reservoir heat exchanger bypass 260 as in the expendable liquid system 300 in FIG. 3 or the expendable liquid system 204 in FIG. 2. In this illustrative embodiment, the coolant in the reservoir 402 may be a mixture of water and alcohol (e.g., methanol) that is selected to avoid freezing of the coolant in the reservoir. In one example, the reservoir 402 may contain a 50/50 mixture of water and methanol that may not freeze due to a freeze point of about −60 C.

Figure 6:
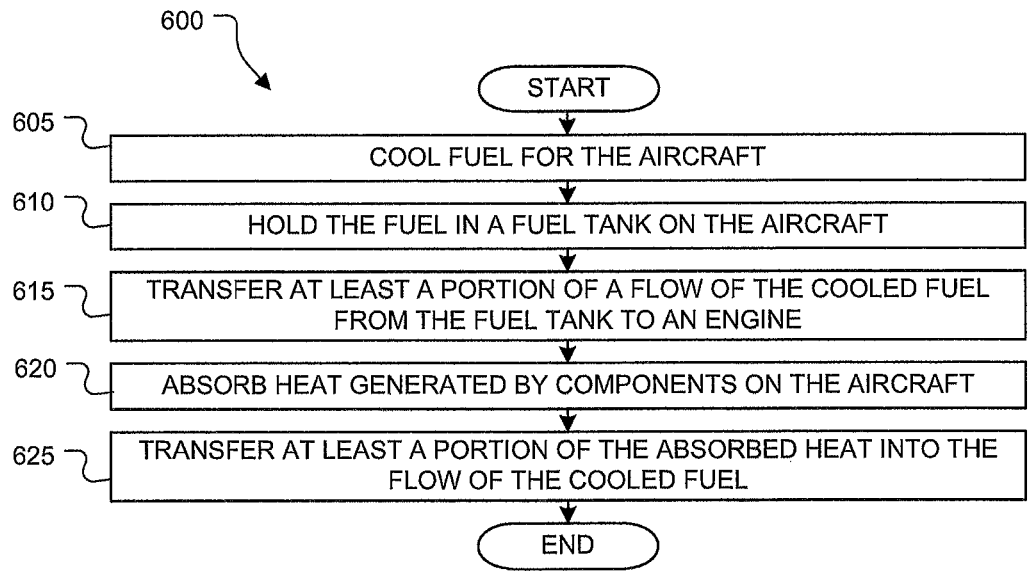
FIGS. 6 and 7 illustrate flowcharts of processes for cooling an aircraft in accordance with various embodiments of the present disclosure.

FIG. 6 illustrates a flowchart of processes for cooling an aircraft in accordance with various embodiments of the present disclosure. The process illustrated in FIG. 6 may be performed by the thermal management system 100 in FIG. 1.

The process begins with the system cooling fuel for the aircraft (step 605). In step 605, the system may cool the fuel prior to the fuel being placed on the aircraft, cool the fuel while the fuel is on the aircraft, or a combination of both. The system then holds the fuel in a fuel tank on the aircraft (step 610).

The system then transfers at least a portion of a flow of the cooled fuel from the fuel tank to an engine (step 615). In step 615, the system may supply a constant follow of fuel from a fuel tank. A portion of the flow may be supplied to the aircraft engine with the remaining fuel returned to the fuel tank.

The system then absorbs heat generated by components on the aircraft (step 620). In step 620, the system may include a cooling loop with a coolant that flows throughout portions of the aircraft to absorb heat generated by heat generating components on the aircraft. The system then transfers at least a portion of the absorbed heat into the flow of the cooled fuel (step 625). In step 625, the system may transfer the heat absorbed in the cooling loop to the cooled fuel using a heat exchanger, such as the heat exchanger 135 in FIG. 1. The heat may be transferred into the flow of the cooled fuel prior to the portion of the flow of fuel being provided to the aircraft engine.

Figure 7:
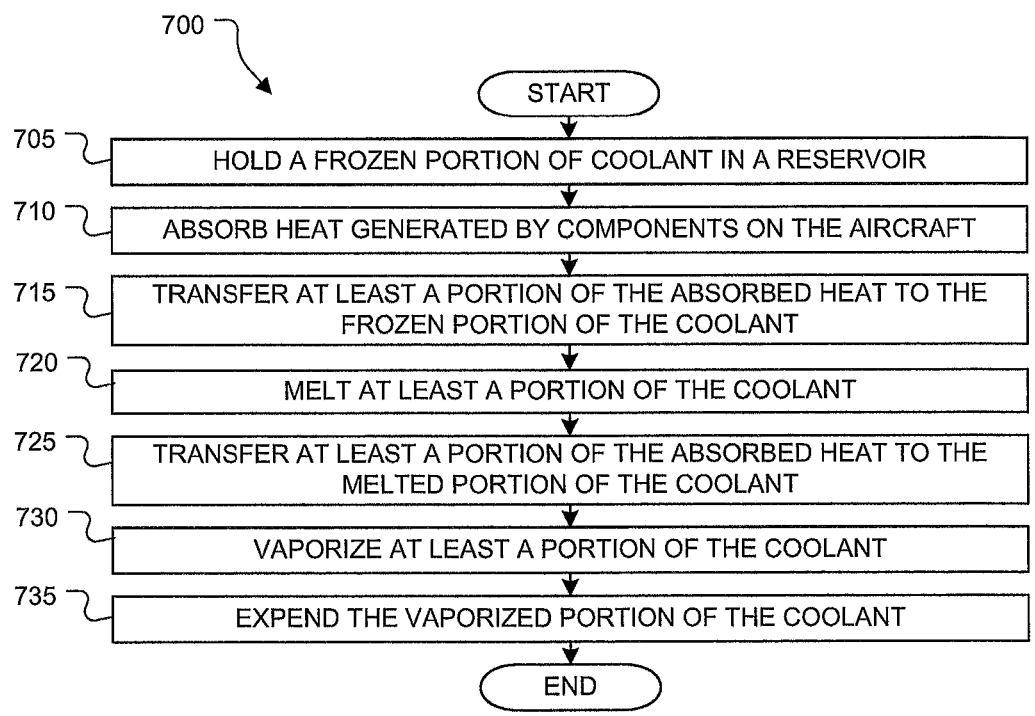

FIG. 7 illustrates a flowchart of processes for cooling an aircraft in accordance with various embodiments of the present disclosure. The process illustrated in FIG. 7 may be performed by the thermal management system 100 in FIG. 1.

The process begins with the system holding a frozen portion of coolant in a reservoir (step 705). In step 705, the system may freeze the coolant in the reservoir using cooling coils. Alternatively, the system may not intentionally freeze the coolant but the coolant may freeze due to exterior conditions.

The system then absorbs heat generated by components on the aircraft (step 710). In step 710, the system may include a cooling loop with a coolant that flows throughout portions of the aircraft to absorb heat generated by heat generating components on the aircraft.

The system then transfers at least a portion of the absorbed heat to the frozen portion of the coolant (step 715). In step 715, the system may transfer the heat absorbed in the cooling loop to the frozen portion of the coolant using a heat exchanger, such as the heat exchanger 140 in FIG. 1. The system then melts at least a portion of the coolant (step 720). In step 720, the system melts the coolant using the heat transferred from the cooling loop.

The system then transfers at least a portion of the absorbed heat to the melted portion of the coolant (step 725). In step 725, the system may transfer the heat absorbed in the cooling loop to the frozen portion of the coolant using a heat exchanger, such as the heat exchanger 145 in FIG. 1. The system then vaporizes at least a portion of the coolant (step 730). In step 730, the system vaporizes the coolant using the heat transferred from the cooling loop. The system then expends the vaporized portion of the coolant (step 735). In step 735, the system may expend the coolant overboard by a vapor steam via a vent on the aircraft.

Embodiments of the present disclosure recognize that the amount of fuel typically placed on the aircraft contributes a significant portion of the total mass of the aircraft and is expended during flight. Using fuel cooled prior to take off and heat exchangers described herein, embodiments of the present disclosure dump heat produced during flight into the fuel. Additionally or alternatively, embodiments of the present disclosure provide an expendable liquid system using a three-phase expendable coolant. By absorbing heat to not only melt but also vaporize the expendable coolant, embodiments of the present disclosure are able to provide cooling to components on the aircraft. These systems and methods for cooling have the advantageous effects of providing additional cooling to aircraft thereby extending the mission time and/or amount of heat tolerance of the aircraft.

It may be advantageous to set forth definitions of certain words and phrases used throughout this patent document.

The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for cooling an aircraft, the system comprising:
a fuel tank configured to hold cooled fuel for the aircraft;
a fuel delivery system including a first valve, the fuel delivery system configured to provide at least a portion of the fuel from the fuel tank to an engine of the aircraft;
a cooling system configured to absorb heat generated by components on the aircraft;
a first heat exchanger thermally connected to the fuel delivery system and the cooling system, the first heat exchanger configured to transfer at least a first portion of the heat from the components on the aircraft to the fuel;
a reservoir configured to hold a coolant at least a portion of which is frozen;
a second heat exchanger thermally connected to the reservoir and the cooling system, the second heat exchanger configured to transfer at least a second portion of the heat from the components on the aircraft to the frozen portion of the coolant to melt at least a portion of the coolant;
a third heat exchanger;
a fluid transfer device including a second valve, the fluid transfer device configured to transfer the melted portion of the coolant to the third heat exchanger, the third heat exchanger thermally connected to the cooling system, the third heat exchanger configured to transfer at least a third portion of the heat from the components on the aircraft to the melted portion of the coolant to vaporize at least a portion of the coolant; and
a vent configured to expend the vaporized portion of the coolant from the aircraft.

2. The system of claim 1, further comprising:
a cooling device in the reservoir, the cooling device configured to freeze at least the portion of the coolant.

3. The system of claim 1, wherein:
the second and third heat exchangers are configured to receive a second coolant in the cooling system and to receive heat from the second coolant;
the third heat exchanger is configured to receive the second coolant after the second coolant passes through the second heat exchanger; and
the system further comprises a bypass configured to prevent at least part of the second coolant from passing through the second heat exchanger and to direct the at least part of the second coolant to the third heat exchanger.

4. The system of claim 3, further comprising:
a controller configured to monitor a temperature of the coolant in the reservoir and a temperature of the second coolant in the cooling system at the second heat exchanger and to control operation of the bypass.

5. The system of claim 1, wherein:
the first, second, and third heat exchangers are configured to receive a second coolant in the cooling system and to receive heat from the second coolant; and
the system further comprises a bypass configured to prevent at least part of the second coolant from passing through the first heat exchanger.

6. The system of claim 5, further comprising:
a controller configured to monitor a temperature of the fuel and a temperature of the second coolant in the cooling system at the first heat exchanger and to control operation of the bypass.

7. A system for cooling an aircraft, the system comprising:
a reservoir configured to hold a coolant at least a portion of which is frozen;
a cooling system configured to absorb heat generated by components on the aircraft;
a first heat exchanger configured to transfer at least a first portion of the heat from the components on the aircraft to the frozen portion of the coolant to melt at least a portion of the coolant;
a second heat exchanger;
a fluid transfer device including a first valve, the fluid transfer device configured to transfer the melted portion of the coolant to the second heat exchanger, the second heat exchanger configured to transfer at least a second portion of the heat from the components on the aircraft to the melted portion of the coolant to vaporize at least a portion of the coolant; and
a vent configured to expend the vaporized portion of the coolant from the aircraft.

8. The system of claim 7, further comprising:
a cooling device configured to freeze at least the portion of the coolant.

9. The system of claim 7, wherein the cooling system includes a loop comprising a liquid coolant configured to flow through the loop to absorb the heat generated by the components on the aircraft.

10. The system of claim 7, further comprising:
a fuel tank configured to hold cooled fuel for the aircraft;
a fuel delivery system including a second valve, the fuel delivery system configured to provide at least a portion of the fuel from the fuel tank to an engine of the aircraft; and
a third heat exchanger configured to transfer at least a third portion of the heat from the components on the aircraft to the cooled fuel.

11. The system of claim 10, further comprising:
a fuel cooling system configured to cool the fuel in the fuel tank on the aircraft.

12. The system of claim 10, wherein the fuel is cooled prior to being placed into the fuel tank.

13. The system of claim 10, wherein:
the first, second, and third heat exchangers are configured to receive a second coolant in the cooling system and to receive heat from the second coolant; and the system further comprises a bypass configured to prevent at least part of the second coolant from passing through the third heat exchanger.

14. The system of claim 13, further comprising:
a controller configured to monitor a temperature of the fuel and a temperature of the second coolant in the cooling system at the third heat exchanger and to control operation of the bypass.

15. The system of claim 7, wherein:
the first and second heat exchangers are configured to receive a second coolant in the cooling system and to receive heat from the second coolant;
the second heat exchanger is configured to receive the second coolant after the second coolant passes through the first heat exchanger; and
the system further comprises a bypass configured to prevent at least part of the second coolant from passing through the first heat exchanger and to direct the at least part of the second coolant to the second heat exchanger.

16. The system of claim 15, further comprising:
a controller configured to monitor a temperature of the coolant in the reservoir and a temperature of the second coolant in the cooling system at the first heat exchanger and to control operation of the bypass.

17. A method for cooling an aircraft, the method comprising:
absorbing heat generated by components on the aircraft using a cooling system;
holding a coolant in a reservoir, wherein at least a portion of the coolant is frozen;
transferring at least a first portion of the heat absorbed from the components on the aircraft to the frozen portion of the coolant to melt at least a portion of the coolant using a first heat exchanger;
transferring the melted portion of the coolant to a second heat exchanger;
transferring at least a second portion of the heat absorbed from the components on the aircraft to the melted portion of the coolant to vaporize at least a portion of the coolant using the second heat exchanger; and
expending the vaporized portion of the coolant from the aircraft using a vent.

18. The method of claim 17, further comprising:
holding cooled fuel in a fuel tank on the aircraft;
transferring at least a portion of a flow of the fuel from the fuel tank to an engine of the aircraft; and
transferring at least a third portion of the heat absorbed from the components on the aircraft into the flow of the fuel.

19. The method of claim 18, further comprising:
returning a portion of the flow of the fuel to the fuel tank.

20. The method of claim 18, further comprising:
cooling the fuel for the aircraft prior to placing the fuel in the fuel tank.

21. The method of claim 18, further comprising:
cooling the fuel for the aircraft while the fuel is in the fuel tank.

* * * * *